(12) United States Patent
Leyva (10) Patent No.: US 7,027,174 B2
(45) Date of Patent: Apr. 11, 2006

(54) CONFIGURING INPUT AND OUTPUT SPEEDS IN A MEDIA HANDLING SYSTEM

(75) Inventor: Ricardo Osuna Leyva, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 09/874,789

(22) Filed: Jun. 4, 2001

(65) Prior Publication Data

US 2002/0181002 A1    Dec. 5, 2002

(51) Int. Cl.
*G06F 3/12*     (2006.01)
(52) U.S. Cl. .................... 358/1.15; 358/1.12; 358/396; 347/14; 347/16; 400/76
(58) Field of Classification Search .............. 358/1.15, 358/1.12, 296, 1.18; 347/14, 16; 400/76
See application file for complete search history.

(56) References Cited

U.S. PATENT DOCUMENTS

| | | | | |
|---|---|---|---|---|
| 5,361,088 A | | 11/1994 | Ito et al. | |
| 5,363,175 A | * | 11/1994 | Matysek | 399/77 |
| 5,629,775 A | * | 5/1997 | Platteter et al. | 358/296 |
| 5,646,740 A | * | 7/1997 | Webster et al. | 358/296 |
| 5,933,679 A | * | 8/1999 | Palumbo | 399/43 |
| 6,241,404 B1 | * | 6/2001 | Fietze et al. | 400/76 |

FOREIGN PATENT DOCUMENTS

| | | | |
|---|---|---|---|
| EP | 0694832 | | 1/1996 |
| FR | 0-571-194 A1 | * | 5/1999 |

* cited by examiner

*Primary Examiner*—Joseph R. Pokrzywa
*Assistant Examiner*—Yixing Qin (57) ABSTRACT

A media-handling system includes a printer having an output that is variable among a variety of different speeds. A first accessory device has an input that is coupled to receive media from the output of the printer. The first accessory device is configured to communicate an associated input speed to the printer. The printer may also have an input that is variable among a variety of different speeds. The printer includes a print engine that is capable of communicating with other devices coupled to the printer.

14 Claims, 7 Drawing Sheets

CONFIGURING INPUT AND OUTPUT SPEEDS IN A MEDIA HANDLING SYSTEM

TECHNICAL FIELD

The invention relates to devices that handle print media, such as printers, copiers, and facsimile machines. More particularly, the invention relates to a method and system for configuring the input and output speeds of multiple devices coupled to one another.

BACKGROUND

Printer technology continues to advance, resulting in commercially available printers having faster speed, increased print quality, and improved features. A wide range of printers are commercially available, ranging from relatively inexpensive "desktop" models with few features to more expensive "printing press" models that have many features and expandable options.

Many printers offer optional accessories that are attached to the input or output of the printer. One or more of these optional accessory devices may be connected serially to perform various functions, such as binding documents, stapling documents, hole-punching documents, or depositing a document into an appropriate mailbox.

When passing document pages from one device to another (e.g., from a printer to a stapling device), it is important that the output speed of one device matches the input speed of the other device so that the pages move between the two devices at a constant speed. If the output speed of one device does not match the input speed of the next device, paper handling problems can occur. For example, if the output speed of the first device is slower than the input speed of the second device, then the second device will be trying to "pull" the paper out of the first device, which may damage the paper handling mechanism in the first device or may tear the paper. If the output speed of the first device is faster than the input speed of the second device, then the second device cannot receive the paper fast enough, which may cause the paper to wrinkle and create a paper jam.

In certain existing systems, all devices operate at the same speed (i.e., all devices have the same input speeds and output speeds). These systems provide relatively simple operation because there are no paper handling speed differences from one device to the next.

In systems having a printer with variable output speeds, the printer's output speed is adjusted to match the speed of the next device. However, if a device with a particular output speed is coupled to the input of the printer, problems occur if the printer changes its linear speed. In this situation, paper handling problems occur because the output speed of the device no longer matches the input speed of the printer.

The embodiments described herein address these and other problems using an improved method and system for configuring the input and output speeds of multiple media-handling devices coupled to one another.

SUMMARY

In one embodiment, a media-handling system includes a printer having an output that is variable among multiple speeds. A first accessory device has an input coupled to receive media from the output of the printer. The input of the first accessory has an associated speed. The first accessory device is configured to communicate the input speed to the printer.

According to another embodiment, the printer has an input that is variable among multiple speeds.

In another embodiment, the printer includes a print engine capable of communicating with devices coupled to the printer.

In a described embodiment, a second accessory device has an input coupled to receive media from an output of the first accessory device. The input of the second accessory device has an associated speed. The second device is configured to communicate the input speed to the first accessory device.

A particular embodiment identifies a second device coupled to an output of a first device. The output of the first device is variable among a variety of speeds. A list of the plurality of output speeds is provided to the second device. A selected output speed is then received from the second device. The selected output speed is the speed at which the first device is to output media to the second device.

BRIEF DESCRIPTION OF THE DRAWINGS

The configuration methods and systems are illustrated by way of example and not limitation in the figures of the accompanying drawings. The same numbers are used throughout the figures to reference like components and/or features.

DETAILED DESCRIPTION

The embodiments described herein provide a method and system that configures the input and output speeds of multiple media-handling devices coupled to one another. Specifically, the input and/or output speeds of one or more devices are adjusted such that the media is properly handled between each pair of devices (i.e., the output speed of a first device matches the input speed of the next device in the serial chain of devices). The embodiments described herein allow devices with different input and output speeds to work together in the same system. The described embodiments also allow devices with different input and output speeds (within the same device) to be coupled to other devices. Additionally, the input and/or output speeds of a particular device can be changed "on the fly" between different pages of a print job.

Figure 1:
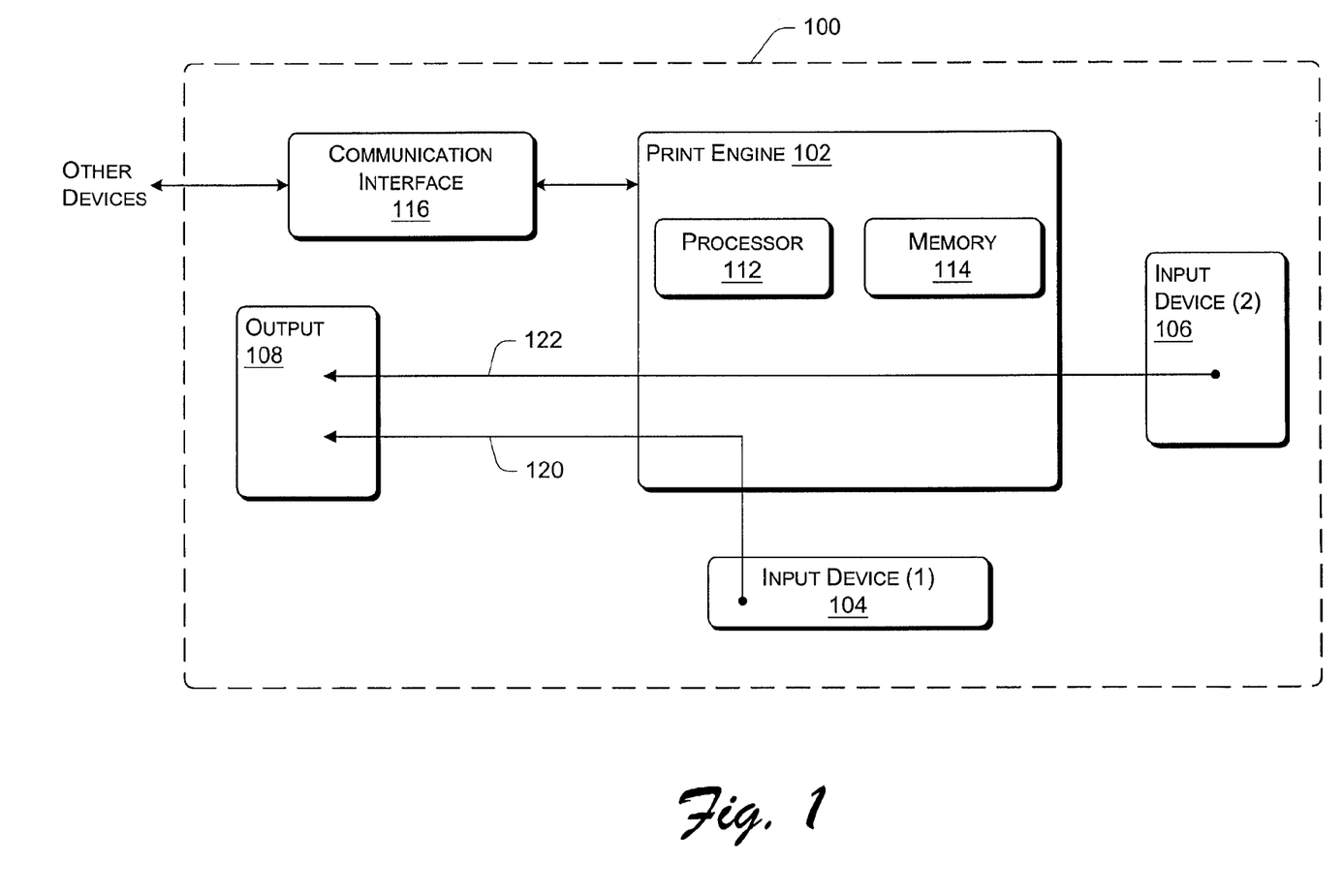
FIG. 1 illustrates various portions of an exemplary printer.

FIG. 1 is a block diagram illustrating various portions of an exemplary printer 100. As used herein, a printer refers to any type of device that can generate an image (e.g., a letter, a picture, a drawing, etc.) on any type of print media, such as paper, cardstock, plastic, or fabric. Example devices include impact printers, non-impact printers, digital copiers, analog copiers, facsimile machines, press machines, silk screen machines, etc. Printers can produce images in any of a wide variety of conventional print media (paper, plastic, fabric, etc.). However, for ease of discussion, printers are discussed herein in the context of printing on paper.

The printer 100 includes a print engine 102 and a pair of input devices 104 and 106. The printer 100 also has at least one output device 108. During a printing operation, a sheet of paper is provided to print engine 102 from one of the input devices 104 or 106, or from a direct paper feed (e.g., an external direct-feed tray). As the sheet of paper passes through the print engine 102, the appropriate information is printed on the paper. The paper can be printed in any of a wide variety of conventional manners, such as a conventional laser printing process or a conventional inkjet printing process. After printing, the sheet of paper is output directly by print engine 102 to an output 108, such as an output bin (or output tray), or other device capable of outputting the sheet of paper from the printer. The output 108 may be coupled to another device (not shown) that further processes the sheet of paper. This further processing is discussed in greater detail below.

Input devices 104 and 106 represent a variety of print medium sources and pre-processing devices. Examples of input devices 104 and 106 include: a device with one or more paper trays for supplying one or more sizes or types of paper to print engine 102; a pre-processing device to put a "stamp" on each sheet of paper prior to printing (such as physically adding a stamp to the sheet of paper or adding a graphical image or text to the information for each page); a paper separating device that separates fan-folded media into separate sheets or to cut a sheet of paper from a roll of paper; a device to affix another piece of paper to the sheet for printing (e.g., a Post-It® Note); a hole punching device to punch hole(s) in each sheet of paper; or a scanning device, such as to obtain a serial number or other identifier from a sheet of paper to verify that pre-printed media is oriented correctly for printing.

Input devices 104 and 106 may have fixed linear input speeds or variable linear input speeds. The linear input speed is the speed at which the paper is drawn into the input device (e.g., expressed in terms of inches per second or millimeters per second). Similarly, the output 108 may have a fixed linear output speed or a variable linear output speed. If output 108 is coupled to the input of another device, it is desirable for the output speed of output 108 to be approximately equal to the input speed of the next device.

Print engine 102, input devices 104 and 106, and output 108 can communicate with one another, transferring control information and data as necessary. Such communication may occur directly between two devices, or may be routed through print engine 102. Printer 100 includes additional components, such as a print head or other mechanism for producing the data to be printed on the print medium in print engine 102.

Print engine 102 includes a processor 112 and a memory/storage device 114. Processor 112 controls the transfer of a print medium through printer 100, including communication of information to the input devices 104 and 106, and the output device 108. As discussed below, processor 112 may also communicate information to other devices coupled to printer 100. Processor 112 may be any type of microprocessor or microcontroller capable of performing the operations necessary to control the operation of printer 100. Alternatively, processor 112 may be replaced by an ASIC (application specific integrated circuit) or other customized device capable of controlling the printer 100.

Memory 114 is a volatile and/or nonvolatile memory, such as a RAM (random access memory), a ROM (read only memory), a Flash EEPROM (electronically erasable programmable read only memory), or a magnetic or optical storage device. Memory 114 stores various information generated and/or used during the operation of the printer 100. Although memory 114 is illustrated as being separate from processor 112, all or part of memory 114 may be incorporated into processor 112.

A communication interface 116 is coupled to the print engine 102 and allows the print engine to communicate with other devices, such as other printers or other media processing devices (e.g., staplers, binders, or sorters) coupled to the printer 100. Communication interface 116 provides bi-directional communication between print engine 102 and the other printers or media processing devices. Although the communication interface 116 is illustrated in FIG. 1 as a separate component, in alternate embodiments, the communication interface 116 is integrated into the print engine 102.

Figure 2:
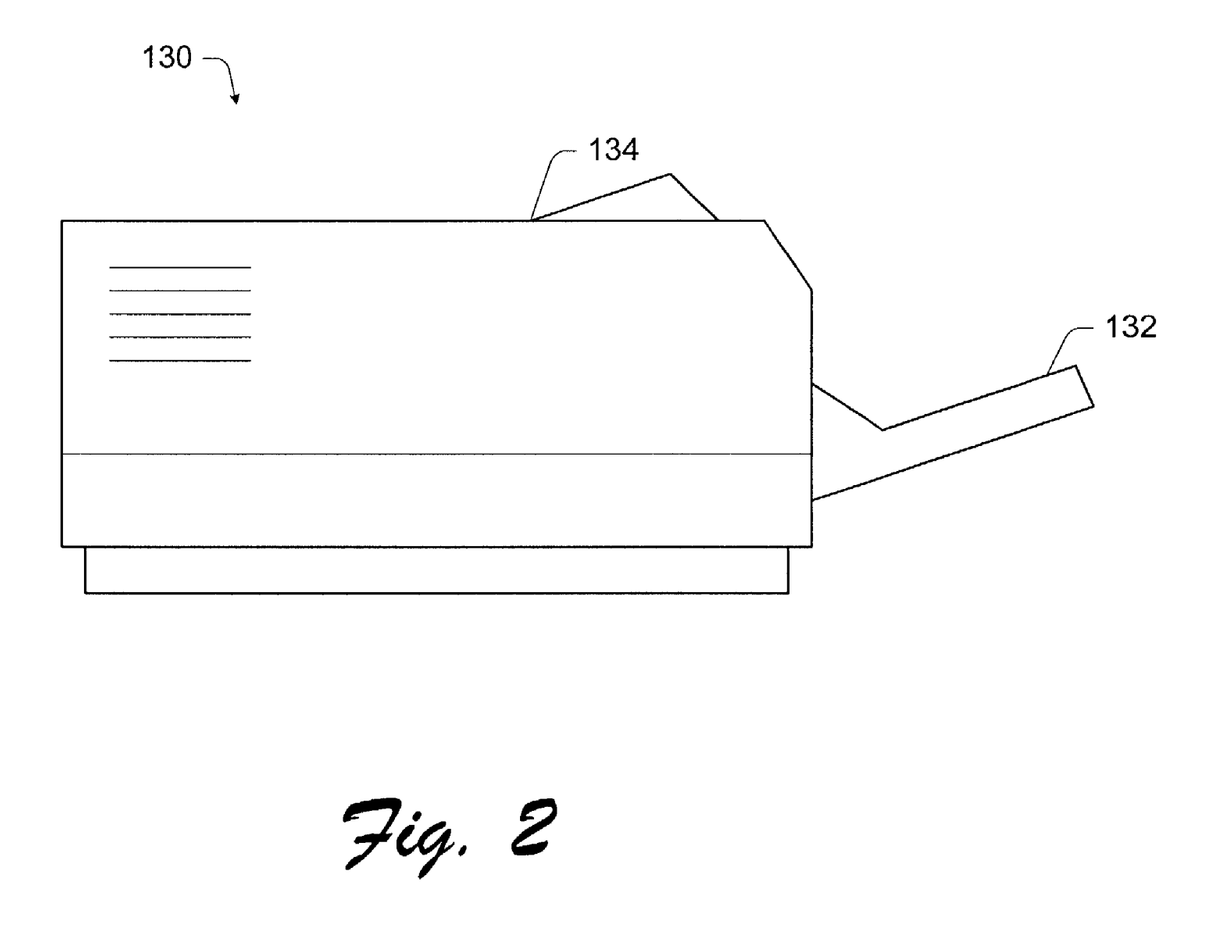
FIG. 2 illustrates an exemplary printer.

FIG. 2 illustrates an exemplary printer 130. Printer 130 may be the print engine 102 of FIG. 1. For example, an input tray 132 is a paper source and an output bin 134 on top of the printer 130 collects the printed pages after printing. Alternatively, printer 130 can be the combination of print engine 102, output 108, and one or both input devices 104 and 106.

Figure 3:
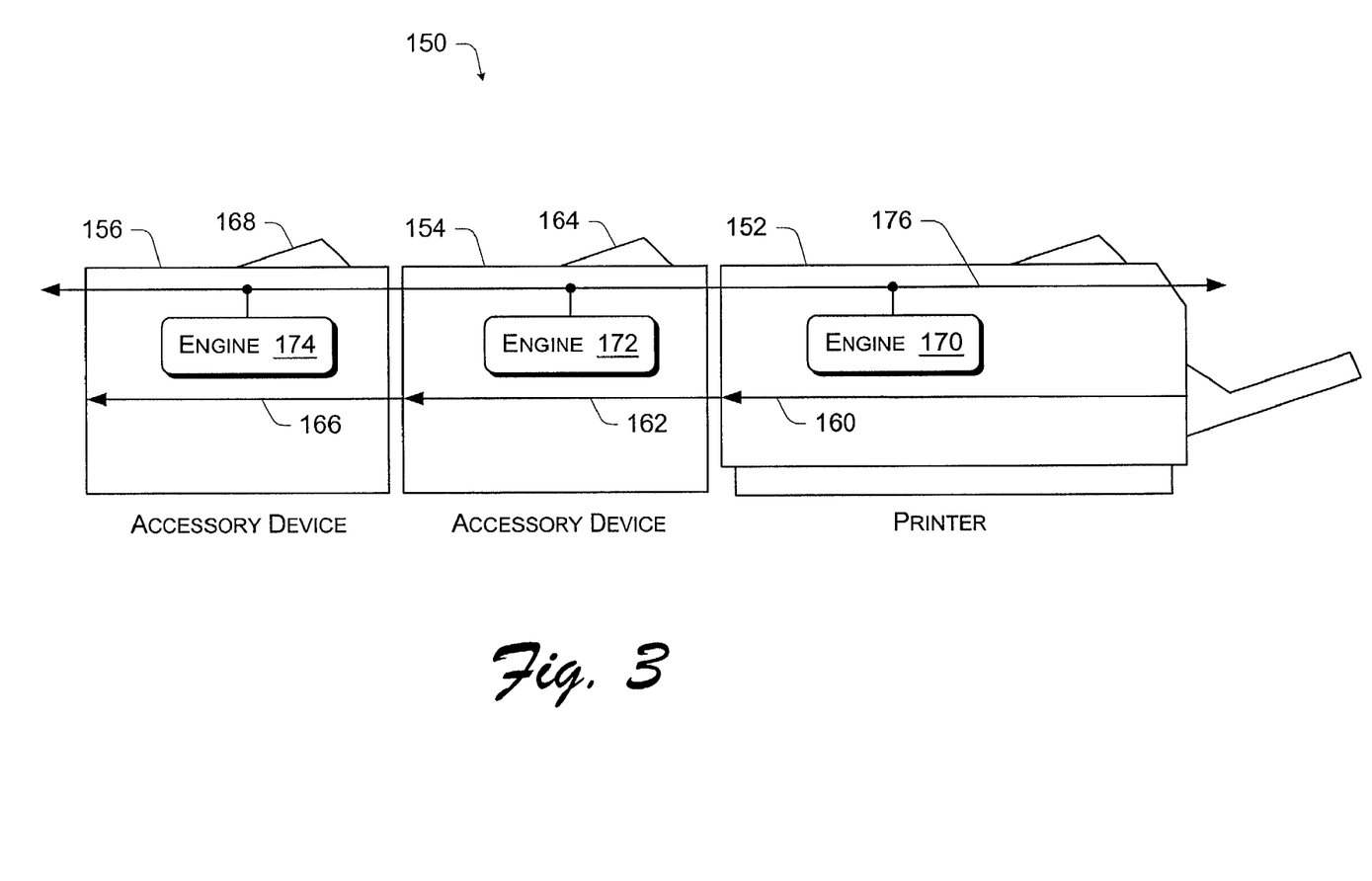
FIG. 3 is a block diagram showing a media-handling system including an exemplary printer and two accessory devices.

FIG. 3 is a block diagram showing a media-handling system 150 including an exemplary printer 152 and two accessory devices 154 and 156 serially coupled to the printer. The two accessory devices 154 and 156 can be any type of device that further processes one or more sheets of paper, such as a paper sorter; a paper folder; a stapler; a hole punch; a gluing/binding device; a booklet maker to organize, fold, and bind the output as appropriate for a booklet; a device to stuff the paper into an envelope and optionally seal the envelope; a device to add job dividers such as covers or colored paper; a shrink wrap device to wrap the printed sheets; a device to add tabbed section dividers; a perforating device to perforate the printed sheets; a device to cut an arbitrary shape in the printed sheets; a laminator to laminate all or a part of a sheet (e.g., only the tabs); a mailbox device with different locations to receive printed sheets for different individuals; an embosser to emboss the printed sheets; a device to remove pieces of paper affixed to the sheet of paper for printing (e.g., Post-It® Notes); a device to affix ink from a just-printed medium to transfer onto cloth (e.g., iron onto a t-shirt); or a shredder.

Each accessory device 154 and 156 includes a "straight-through" paper path (i.e., path 162 in accessory device 154 and path 166 in accessory device 156). The printer's "straight through" path 160 can be coupled to path 162 of accessory device 154, which allows printed sheets from printer 152 to be received and processed by accessory device 154. Similarly, the output of path 162 can be coupled to path 166 of accessory device 156, which allows the printed sheets received from accessory device 154 to be processed by accessory device 156. The output of path 168 can be coupled to other accessory devices (not shown) for further processing of the printed sheets.

In addition to the "straight-through" paper path (i.e., path 162 in accessory device 154 and path 166 in accessory device 156), each accessory device may include a separate paper path (not shown) which deposits one or more sheets into the accessory device's output tray (e.g., a tray 164 on accessory device 154 or a tray 168 on accessory device 156). Sheets are deposited into the device's output tray, for example, if no additional processing is necessary. If the accessory device is a stapler, no further processing is typically performed after the sheets are stapled together. In this situation, the stapled sheets are deposited into the stapling device's output tray.

The last accessory device in the serial "chain" (e.g., the accessory device farthest from the printer) may not have a "straight-through" paper path, because the accessory device does not couple its output to another accessory device. Thus, the last accessory device in the chain may have one or more paper paths that terminate at a paper tray or other output mechanism. If the last accessory device does have a "straight-through" paper path, it is typically disabled, unless the "straight-through" path terminates with a paper tray.

Although FIG. 3 illustrates a printer 152 and two accessory devices 154 and 156, the teachings of the present invention can be applied to any number of accessory devices coupled to a printer and/or other accessory devices in the manner shown in FIG. 3. Furthermore, the printer and the various accessory devices can be arranged in any order. For example, the printer may be located between multiple accessory devices, such that the printer is not the first device in the "chain". In this example, the sheets are handled by one or more accessory devices before reaching the printer, and then handled by one or more accessory devices after being output from the printer. A particular "chain" may contain any number of accessory devices and any number of printers.

Although a sheet of paper passes through an accessory device, the accessory device does not necessarily "process" the sheet. For example, a particular accessory device may punch holes in each printed sheet such that the sheets can be stored in a 3-ring binder. If a particular print job does not require hole punches, that accessory device simply passes the print job through the device using its "straight-through" paper path. Further, certain print jobs may require that different sheets receive different processing. For example, a particular sheet in a print job may be laminated (such as a cover page), while other sheets in the same print job are not laminated. In this example, the accessory device that laminates printed sheets will process (i.e., laminate) the cover page, but not process the remaining sheets in the print job. Thus, the remaining sheets simply pass through the laminating accessory device on the "straight-through" paper path.

To avoid paper handling problems, it is important for the output speed of one device to be approximately equal to the input speed of the next device. The "input speed" of the device refers to the linear rate at which the paper is received into the device. The "output speed" of the device refers to the linear rate at which the paper is output from the device. The variance permitted between the output speed of one device and the input speed of the next device depends on the buffer size provided by the receiving device or provided at the interface between the two devices. The output speed of the sending device can be greater than the input speed of the receiving device if the sending device or the receiving device have the ability to buffer (or queue) a partial sheet or one or more full sheets of media.

The input speed and the output speed can be measured, for example, in terms of inches per second or millimeters per second. For example, the output speed of printer 152 should be approximately equal to the input speed of accessory device 154. Similarly, the output speed of accessory device 154 should be approximately equal to the input speed of accessory device 156. If the input and output speeds of adjacent devices are not approximately equal, then paper jams, paper damage, and other problems may occur as the sheets try to change speeds between devices.

Although the output speed of one device should be approximately equal to the input speed of the next device, a particular device may have different input and output speeds. For example, a device may have an input speed that is slower than the output speed. Thus, once the device has received and processed a particular sheet, that sheet is output from the device at a faster rate than the rate at which it was received. Alternately, a device may have an input speed that is faster than the output speed. In this situation, the device may need to buffer one or more sheets because the device can receive sheets faster than it can output the sheets to the next device. For example, an accumulator at the device input may store pages awaiting processing by the device. If the accumulator fills, then the device may send a "WAIT" command to the printer or other devices to prevent the device from receiving additional sheets until the accumulator is able to receive more pages.

In a particular media-handling system, a printer or accessory device may have variable input speeds and/or variable output speeds. In this type of system, the various printers and accessory devices must be properly configured such that the output speed of one device is approximately equal to the input speed of the next device. Each printer and accessory device includes an engine that controls the overall operation of the printer or device. For example, the engine may control the input speed and/or the output speed of a device that has variable speed inputs and/or outputs. The engine may also allow the device to communicate with other devices to coordinate input and output speeds for all devices coupled to one another in a serial chain.

Referring to FIG. 3, printer 152 has an engine 170, which is similar to the print engine 102 discussed above with respect to FIG. 1. Accessory device 154 includes an engine 172 and accessory device 156 includes an engine 174. Engines 172 and 174 may include, for example, a processor and a memory device. Alternatively, engines 172 and 174 may include a microcontroller or other device capable of performing the functions necessary to control the operation of the device and communicate with other devices. The three engines 170, 172, and 174 are coupled together through a bi-directional communication link (or communication bus) 176. The three engines 170, 172, and 174 communicate with one another to adjust input and output speeds, if necessary, such that the output speed of one device is approximately equal to the input speed of the next device.

Figure 4:
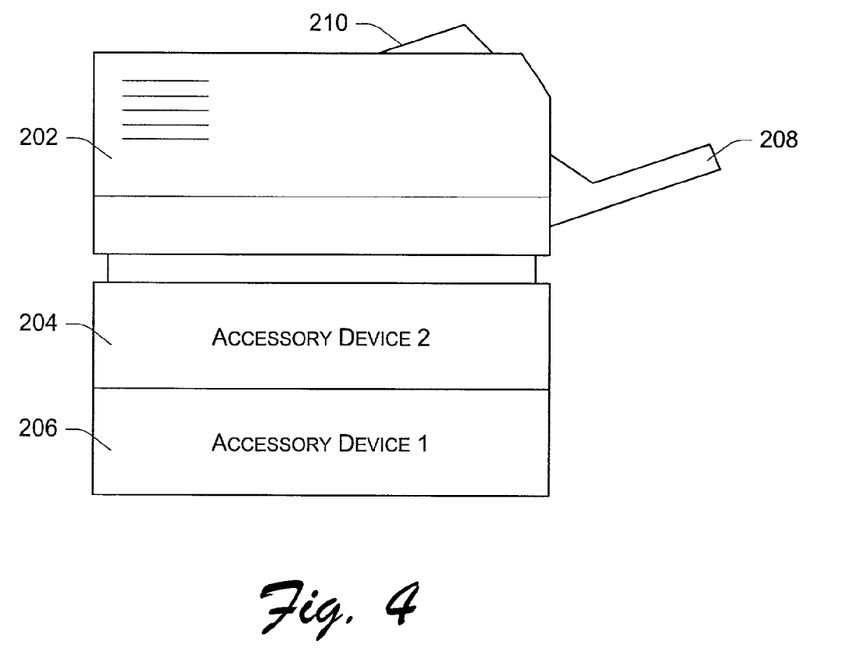
FIG. 4 illustrates an exemplary printer coupled to two input accessory devices.

FIG. 4 illustrates an exemplary printer 202 coupled to two input accessory devices 204 and 206. The two input accessory devices 204 and 206 can be, for example, accessory trays that store paper, envelopes, or other media used by the printer 202 when printing. For example, accessory device 204 may contain paper with an organization's name, logo, and address, and accessory device 206 may contain envelopes that match the paper stored in accessory device 204. Printer 202 also includes a paper tray 208 for manually feeding media into the printer and an output tray 210 for outputting processed media.

Figure 5A:
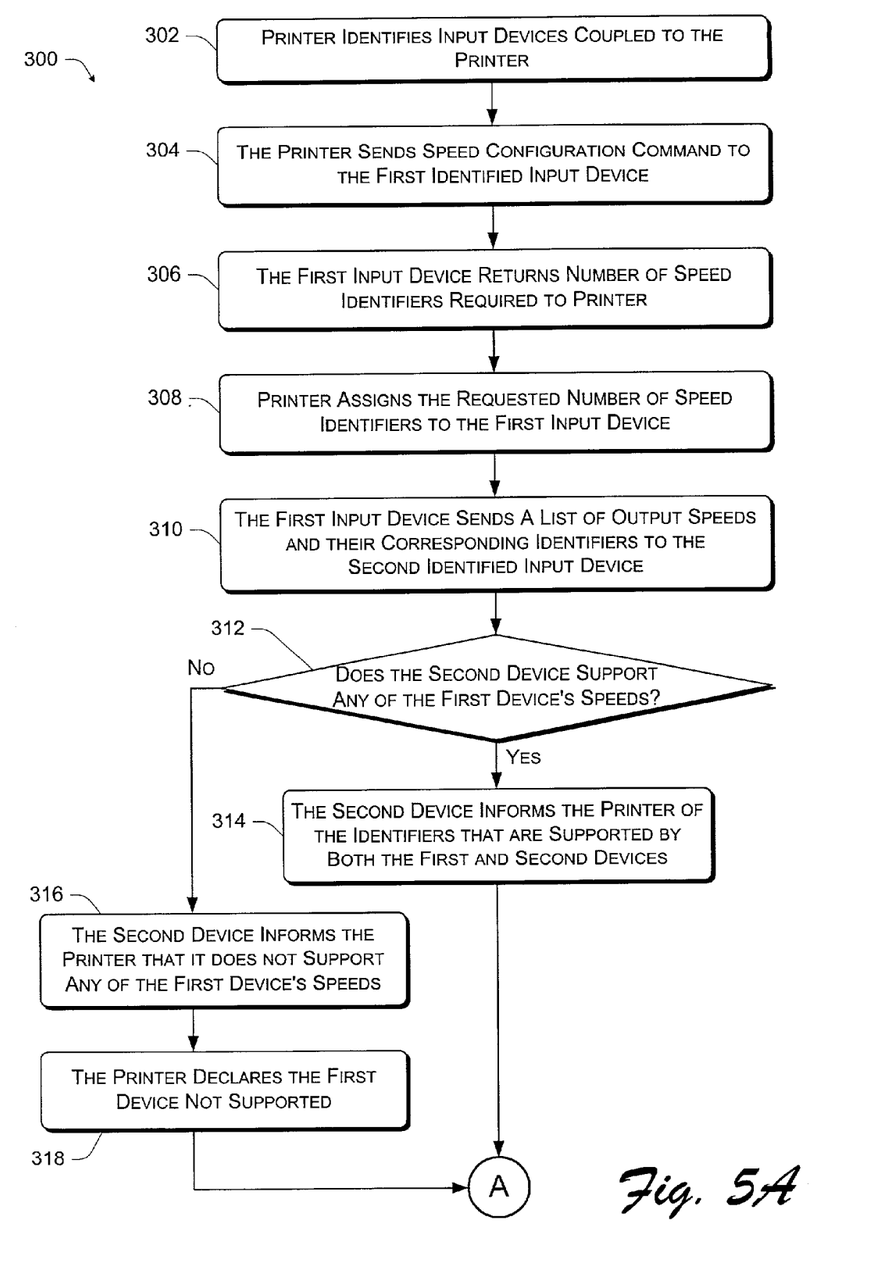
FIGS. 5A and 5B represent a flow diagram illustrating a procedure for configuring speeds of multiple media-handling devices.
Figure 5B:
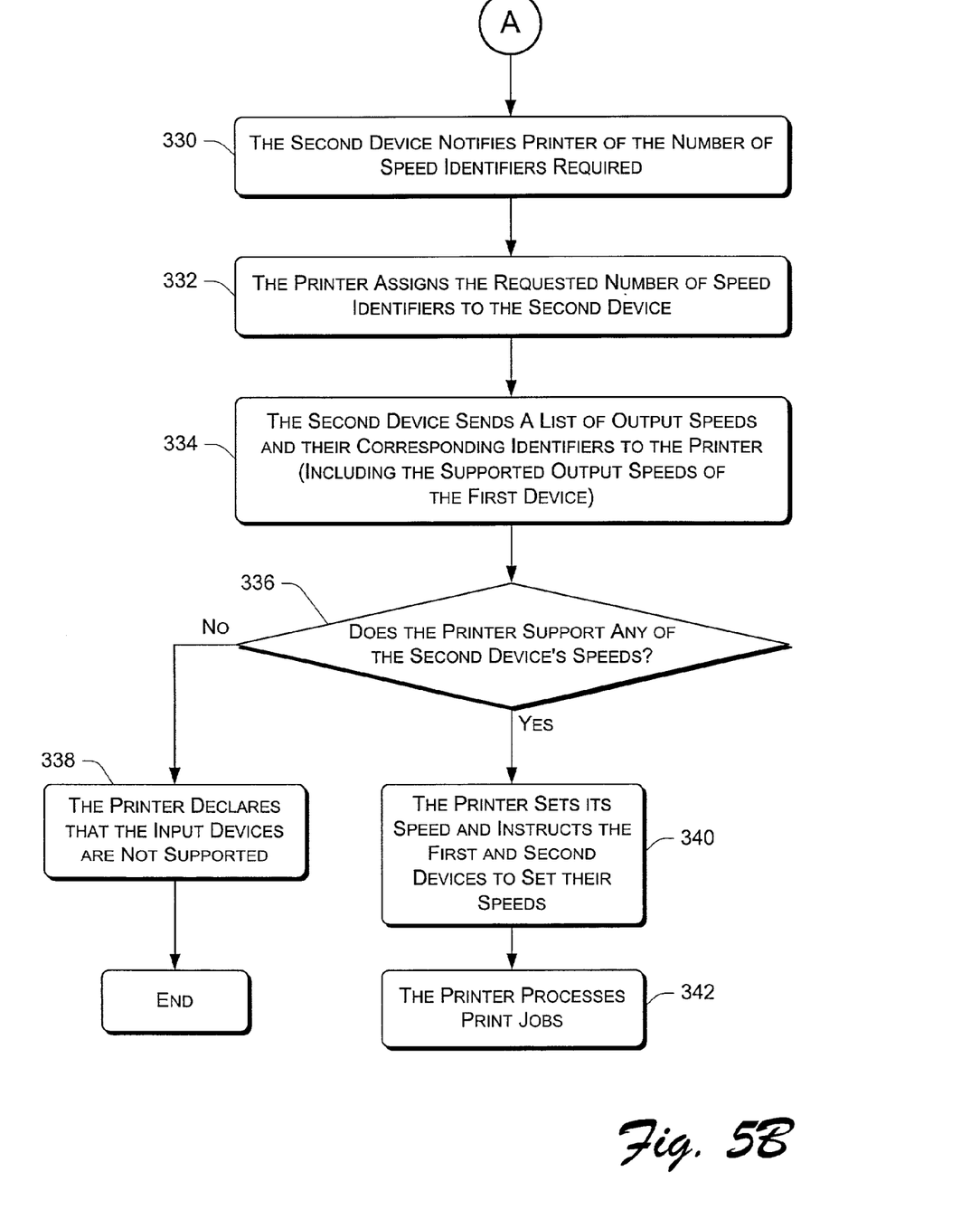

FIGS. 5A and 5B represent a flow diagram illustrating a procedure 300 for configuring speeds of multiple media-handling devices. In this example, a printer's input is coupled to two input accessory devices, such as the configuration shown in FIG. 4. In this example, the printer supports multiple input speeds and must configure itself and the two accessory devices such that media can be properly transferred between the accessory devices and the printer.

Referring to FIG. 5A, the printer first identifies the input devices coupled to the printer (block 302), such as input devices 204 and 206 shown in FIG. 4. The printer then sends a speed configuration command to the first identified input device (block 304). In this example, the first identified input device is device 206 in FIG. 4. The speed configuration command requests the input device to provide the number of different media handling speeds supported by the input device. The first input device responds to the speed configuration command by returning the required number of speed identifiers to the printer (block 306). In this example, the first input device responds that it requires three speed identifiers (i.e., one for each of the three speeds supported by the first input device).

Next, the printer assigns the requested number of speed identifiers to the first input device (block 308). In this example, the printer assigns "speed1", "speed2", and "speed3" to the first input device. At block 310, the first input device then sends a list of output speeds and their corresponding speed identifiers to the second identified input device (e.g., input device 204 in FIG. 4). For example, the first input device may send the following list to the second input device:

speed1=30 mm/sec
speed2=40 mm/sec
speed3=50 mm/sec

Next, the second input device determines whether it supports any of the speeds supported by the first input device (block 312). If the second input device supports one or more of the speeds supported by the first input device, then the second device informs the printer of the identifiers that are supported by both the first input device and the second input device (block 314). In this example, the second input device supports both speed1 and speed3, so the second input device provides these two speed identifiers to the printer. The procedure then continues to block 330 in FIG. 5B.

If the second input device does not support any of the speeds supported by the first input device, the second input device informs the printer that it does not support any of the first device's speeds (block 316). The printer then declares the first input device not supported (block 318) because there is no media speed supported by both the first and second input devices that would allow media to be transferred between the two input devices. The procedure continues to block 330 in FIG. 5B.

Referring to FIG. 5B, the second device notifies the printer of the number of speed identifiers required (block 330). In this example, the second input device notifies the printer that two speed identifiers are required because the second input device supports two speeds in addition to the two speeds also supported by the first input device. The printer assigns the requested number of speed identifiers to the second input device (block 332). In this example, the printer assigns "speed4" and "speed5" to the second input device. The second input device then sends a list of output speeds and their corresponding identifiers to the printer, including the supported output speeds of the first device (block 334). In this example, the second input device sends the following list to the printer:

speed1=30 mm/sec
speed3=50 mm/sec
speed4=60 mm/sec
speed5=70 mm/sec

Next, the printer determines whether it supports any of the speeds supported by the second input device (block 336). If the printer does not support any of the second input device's speeds, then the printer declares that the input devices are not supported (block 338). The input devices cannot be supported if the printer is not able to operate at a speed that is substantially the same as an output speed of the second input device.

If the printer supports one or more of the second input device's speeds, the printer sets its speed and instructs the first and second input devices to set their speeds to match the printer's speed (block 340). If multiple speeds are available for the printer to select from, the printer typically selects the fastest speed. However, slower speeds might be required in certain situations, such as printing on heavy paper, transparencies or envelopes. In another embodiment, the printer does not set the devices speeds. Instead, a "speed" parameter is included with each print job (or with each individual page) that indicates the speed at which the page(s) should be processed. The speed parameter is selected based on the known processing speeds supported by the devices. Finally, the printer begins processing one or more print jobs at block 342.

Although the example discussed above includes two accessory input devices, a similar procedure can be used to adjust the speeds of any number of input devices.

Figure 6:
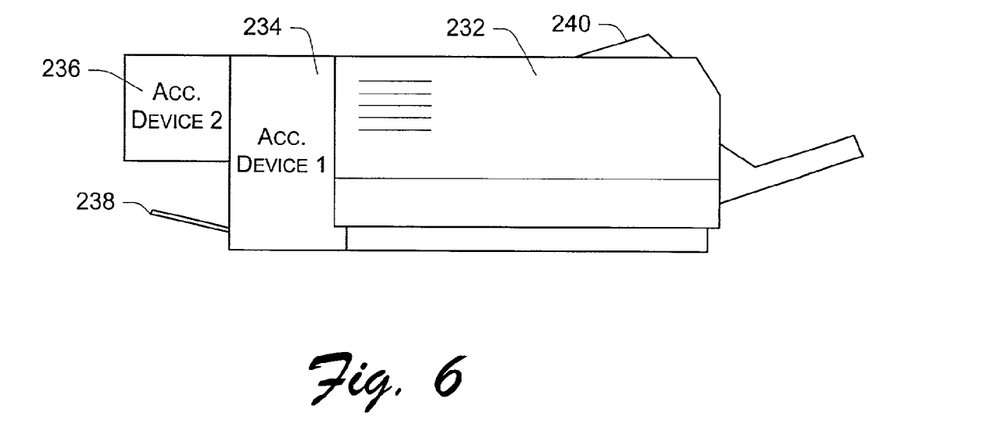
FIG. 6 illustrates an exemplary printer coupled to two output accessory devices.

FIG. 6 illustrates an exemplary printer 232 coupled to two output accessory devices 234 and 236. The two output accessory devices 234 and 236 can be, for example, a stapler, a hole punch, or other media handling or media processing device. Printer 232 also includes an output tray 240 which allows the printer to output media and bypass the output accessory devices 234 and 236. Thus, if the processing provided by output accessory devices 234 and 236 is not required, the printer can output all or a portion of the print job directly to tray 240. Output accessory device 234 includes an output tray 238 which allows output accessory device 234 to output media and bypass output accessory device 236. For example, if the processing of output accessory device 236 is not required, some or all of the print job can be output directly to tray 238.

Figure 7:
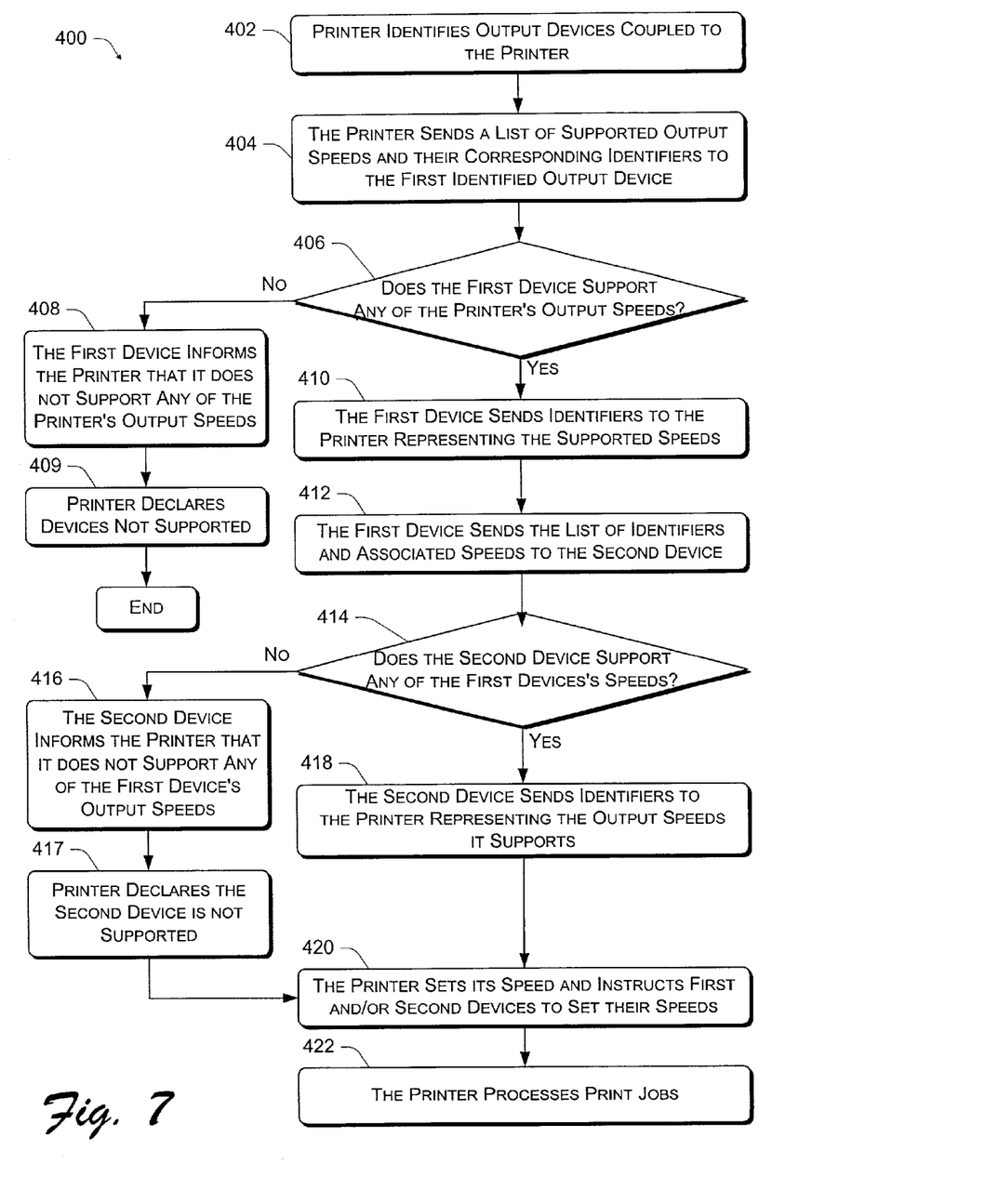
FIG. 7 is a flow diagram illustrating a procedure for configuring speeds of multiple media-handling devices.

FIG. 7 is a flow diagram illustrating a procedure 400 for configuring speeds of multiple media-handling devices. In this example, a printer's output is coupled to two output accessory devices, such as the configuration shown in FIG. 6. The printer in this example supports multiple output speeds and must configure itself and the two accessory devices such that media can be properly transferred between the printer and the accessory devices.

Referring to FIG. 7, the printer identifies all output devices coupled to the printer (block 402), such as output devices 234 and 236 shown in FIG. 6. The printer sends a list of output speeds supported by the printer and their corresponding identifiers to the first identified output device (block 404). In this example, output device 234 of FIG. 6 is the first identified output device. An exemplary list identifying the output speeds supported by the printer is:

speed1=30 mm/sec
speed2=40 mm/sec
speed3=50 mm/sec

At block 406, the first output device determines whether it supports any of the speeds supported by the printer. If not, the procedure 400 branches to block 408, where the first output device informs the printer that it does not support any of the printer's output speeds. The printer then declares that the output devices are not supported (block 409). At this point, the procedure terminates because the first output device cannot receive media from the printer in the current configuration.

If the first output device supports one or more of the printer's output speeds, the procedure 400 continues to block 410, where the first output device sends identifiers to the printer representing the supported speeds. In this example, the first output device supports two speeds and sends identifiers "speed1" and "speed2" to the printer. The first output device then sends the list of identifiers and associated output speeds to the second output device (block 412). In this example, the first output device sends the following list to the second output device:

speed1=100 mm/sec
speed2=100 mm/sec

The two output speeds listed above are the same (100 mm/sec), but the associated input speeds are different. For example, speed1 has an associated input speed (the speed at which the first output device receives media from the printer) of 30 mm/sec and speed2 has an associated input speed of 40 mm/sec.

Next, the second output device determines whether it supports (at its input) any of the first device's output speeds (block 414). If the second output device does not support any of the first device's output speeds, the second output device informs the printer that it does not support the first device's output speeds (block 416). The printer then declares that the second output device is not supported (block 417). In this situation, the printer may allow print jobs to pass to the first output device but will restrict print jobs from passing to the second output device. For example, any print job being processed by the first output device will be deposited in the output tray 238 of the first output device instead of being provided to the second output device. The procedure 400 then continues from block 417 to block 420, which is discussed below.

If the second output device supports at least one of the first device's output speeds, the procedure continues from block 414 to block 418, where the second output device sends identifiers to the printer representing the output speeds it supports. In this example, the second output device supports speed1 and speed 2, each of which identify an output speed from the first output device of 100 mm/sec (which corresponds to the input speed of the second output device). The printer sets its speed and instructs the first and/or second devices to set their speeds (block 420). If multiple speeds are supported, the printer typically selects the fastest supported speed. As mentioned above with respect to block 417, if the second device is not supported, the printer allows print jobs to pass to the first output device but will restrict print jobs from passing to the second output device. Finally, the printer processes print jobs (block 422).

The example discussed above with respect to FIG. 7 includes two accessory output devices. A similar procedure can be used to adjust the speeds of any number of accessory output devices coupled to a printer.

In alternate embodiments, one or more input devices may be coupled to a printer along with one or more output devices. With such embodiments, both the procedures illustrated in FIGS. 5A/5B and FIG. 7 are performed to configure the speeds of the printer, the speeds of the input devices, and the speeds of the output devices.

The procedures described above with respect to FIGS. 5A, 5B, and 7 are typically performed during initialization of the media-handling system (e.g., after power-up or a reset of the system). Generally, the printer queues any incoming print jobs until the procedures discussed above are complete.

Thus, a system and method for configuring the input and output speeds of multiple media-handling devices is described herein. The described embodiments allow devices with variable input and/or output speeds to be configured such that pages properly pass between adjacent devices. This is accomplished by approximately matching the output speed of one device to the input speed of an adjacent device.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A media-handling system comprising:
a printer has an output that is variable among a plurality of printer output speeds, the printer being operable to send a first list to the first accessory device, the first list identifying printer output speeds;
a first accessory device having a first input coupled to receive media from the output of the printer, the first input of the first accessory device being variable among a plurality of first input speeds, the first accessory device being configured to receive the first list and to send a second list to the second accessory device, the second list identifying speeds from the first list that are supported by the first accessory device;
and a second accessory device, wherein: having a second input coupled to receive media from an output of the first accessory device, the second input of the second accessory device being variable among a plurality of second input speeds, wherein the second accessory device is configured to receive the second list and to send a third list to the printer, the third list identifying speeds from the second list that are supported by the second accessory device;
the printer is further operable to set its output speed and instructing the first and second accessory devices to set their speeds according to a speed selected from the third list.

2. A media-handling system as recited in claim 1 wherein the printer has an input that is variable among a plurality of speeds.

3. A media-handling system as recited in claim 1 wherein the printer includes a print engine capable of communicating with the first accessory device.

4. A media-handling system as recited in claim 1 wherein the printer includes a print engine capable of communicating with devices coupled to the printer.

5. A media-handling system comprising a printer, a first accessory device, and a second accessory device, wherein:
the first accessory device having a first output coupled to send media to the second accessory device, the first output being variable among a first number of first output speeds
the second accessory device having a second input coupled to receive media from the first output of the first accessory device and a second output coupled to send media to the printer, the second output being variable among a second number of second output speeds;
the first accessory device being configured to request and receive first speed identifiers for each of the first output speeds from the printer and to send a first list identifying the first output speeds and their corresponding first speed identifiers to the second accessory device;
the second accessory device being configured to inform the printer of the first speed identifiers for those of the first output speeds supported by the second accessory device and to request and receive second speed identifiers for those of the second output speeds not identified by the first list and to send a second list identifying the first and second output speed identifiers and corresponding output speeds to the printer;

the printer having a printer input coupled to receive media from the second output of the second accessory device, the printer configured to assign the first and second speed identifiers to the first and second accessory devices and to set a printer speed equal to a supported one of the of the output speeds identified by the second list and to instruct the first and second accessory devices to set output speeds equal to the supported one of the output speeds.

6. A media-handling system as recited in claim 5 wherein the printer includes a print engine capable of communicating with the first and second accessory devices.

7. A media-handling system as recited in claim 5 wherein the printer includes a print engine capable of communicating with devices coupled to the printer.

8. A media-handling system as recited in claim 5 wherein the first accessory device includes an engine capable of communicating with devices coupled to the first accessory device.

9. A method comprising:
   a printer sending a first list identifying printer output speeds to a first accessory device;
   the first accessory receiving the first list and sending a second list to the printer and to a second accessory device, the second list identifying speeds from the first list that are supported by the first accessory device;
   the second accessory device receiving the second list and sending a third list to the printer, the third list identifying speeds from the second list that are supported by the second accessory device;
   the printer setting its output speed and instructing the first and second accessory devices to set their speeds according to a speed selected from the third list.

10. A method as recited in claim 9 wherein the first accessory device has a single supported speed.

11. A method as recited in claim 10 wherein the output speed set by the printer matches single supported speed of the first accessory device.

12. A method as recited in claim 9 wherein the first accessory device has a plurality of supported speeds.

13. A method as recited in claim 12 wherein the output speed set by the printer matches one of the plurality of supported speeds of the first accessory device.

14. A method comprising:
   a first accessory device requesting and receiving first speed identifiers from a printer for each of a plurality of first accessory device output speeds;
   the first accessory device sending a first list to a second accessory device, the first list identifying the first output speeds and their corresponding first speed identifiers;
   the second accessory device informing the printer of the first speed identifiers for those of the first output speeds supported by the second accessory device;
   the second accessory device requesting and receiving second speed identifiers for those of the second output speeds not identified by the first list;
   the second accessory device sending a second list identifying the first and second output speed identifiers and corresponding output speeds to the printer;
   the printer setting a printer speed equal to a supported one of the of the output speeds identified by the second list; and
   the printer instructing the first and second accessory devices to set output speeds equal to the supported one of the output speeds.

* * * * *

UNITED STATES PATENT AND TRADEMARK OFFICE
CERTIFICATE OF CORRECTION

PATENT NO. : 7,027,174 B2
APPLICATION NO. : 09/874789
DATED : April 11, 2006
INVENTOR(S) : Ricardo Osuna Leyva It is certified that error appears in the above-identified patent and that said Letters Patent is hereby corrected as shown below:

In column 10, line 11, in Claim 1, delete "comprising:" and insert -- comprising a printer, a first accessory device, and a second accessory device, wherein: --, therefor.

In column 10, line 12, in Claim 1, delete "a printer" and insert -- the printer --, therefor.

In column 10, line 16, in Claim 1, delete "a first accessory" and insert -- the first accessory --, therefor.

In column 10, line 24, in Claim 1, delete "and a" and insert -- the --, therefor.

In column 10, line 24, in Claim 1, delete "device, wherein:" and insert -- device --, therefor.

In column 10, line 51, in Claim 5, delete "speeds" and insert -- speeds; --, therefor.

In column 11, line 9, in Claim 5, after "one" delete "of the".

In column 12, line 30, in Claim 14, delete "of the" before "output".

Signed and Sealed this

Twenty-sixth Day of May, 2009

JOHN DOLL
*Acting Director of the United States Patent and Trademark Office*